(12) United States Patent
Lai et al.

(10) Patent No.: US 12,296,342 B2
(45) Date of Patent: May 13, 2025

(54) IN-VITRO DIAGNOSTIC ANALYZER AND REAGENT CARD

(71) Applicant: GUANGZHOU WONDFO BIOTECH CO., LTD., Guangzhou (CN)

(72) Inventors: Yuanqiang Lai, Guangzhou (CN); Xuan Meng, Guangzhou (CN); Jihua Wang, Guangzhou (CN)

(73) Assignee: GUANGZHOU WONDFO BIOTECH CO., LTD., Guangzhou (CN)

( * ) Notice: Subject to any disclaimer, the term of this patent is extended or adjusted under 35 U.S.C. 154(b) by 452 days.

(21) Appl. No.: 17/802,985

(22) PCT Filed: Sep. 16, 2020

(86) PCT No.: PCT/CN2020/115461
§ 371 (c)(1),
(2) Date: Oct. 19, 2022

(87) PCT Pub. No.: WO2021/169251
PCT Pub. Date: Sep. 2, 2021

(65) Prior Publication Data
US 2023/0094356 A1   Mar. 30, 2023

(30) Foreign Application Priority Data
Feb. 28, 2020   (CN) .................. 202010128844.X

(51) Int. Cl.
*B01L 3/00* (2006.01)
*G01N 35/10* (2006.01)

(52) U.S. Cl.
CPC .......... *B01L 3/523* (2013.01); *G01N 35/1002* (2013.01); *B01L 2200/0684* (2013.01);
(Continued)

(58) Field of Classification Search
CPC ............. B01L 3/523; B01L 2200/0684; B01L 2200/16; B01L 2300/0672;
(Continued)

(56) References Cited

U.S. PATENT DOCUMENTS 3,908,638 A   9/1975   Porcher et al.
5,096,669 A   3/1992   Lauks et al.
(Continued)

FOREIGN PATENT DOCUMENTS

CN   103543185 A   1/2014
CN   203732549 U   7/2014
(Continued)

OTHER PUBLICATIONS

International Search Report and Written Opinion, and English Translation thereof, for International Application No. PCT/CN2020/115461, mailed Dec. 23, 2020 (8 pages).
(Continued)

*Primary Examiner* — Jennifer Wecker
*Assistant Examiner* — Britney N. Washington
(74) *Attorney, Agent, or Firm* — Kagan Binder, PLLC

(57) ABSTRACT

An in vitro diagnostic analyzer and a reagent card. The reagent card includes a reagent card body and a mounting body. The mounting body includes a mounting hole configured to receive a sample tube, a hollow needle disposed in the mounting hole, a sealing portion disposed in the mounting hole, and a gas inlet channel. An end of the hollow needle is capable of being inserted into the sample tube. The sealing portion is capable of being in sealing fit with an outer wall of the sample tube. The gas inlet channel includes a gas outlet hole, a gas inlet hole, and a first flow-stopping structure. The gas inlet hole is disposed in a surface of the reagent card body. The first flow-stopping structure is disposed between the gas outlet hole and the gas inlet hole. The
(Continued)

gas outlet hole is configured to be in fluid communication with the sample tube mounted on the mounting hole. The reagent card body includes a sample feeding channel, a test chamber, and a venting end. The sample feeding channel is in fluid communication with a liquid outlet end of the hollow needle. The sample feeding channel and the venting end are both in fluid communication with the test chamber.

17 Claims, 12 Drawing Sheets

(52) U.S. Cl.
CPC ... *B01L 2200/16* (2013.01); *B01L 2300/0672* (2013.01); *B01L 2300/0816* (2013.01); *B01L 2300/0883* (2013.01); *B01L 2300/14* (2013.01)

(58) Field of Classification Search
CPC ..... B01L 2300/0816; B01L 2300/0883; B01L 2300/14; B01L 2400/049; B01L 2400/0633; B01L 2400/0688; B01L 3/502723; B01L 3/50273; G01N 35/1002; G01N 35/00693; G01N 2035/00148; G01N 35/00029; G01N 33/50
See application file for complete search history.

(56) References Cited

U.S. PATENT DOCUMENTS

| | | | |
|---|---|---|---|
| 5,525,302 A | | 1/1996 | Astle |
| 8,986,527 B2 * | | 3/2015 | Lin ................... B01L 3/502715 422/50 |
| 2003/0224523 A1 | | 12/2003 | Thornberg et al. |
| 2006/0228259 A1 | | 10/2006 | Samsoondar |
| 2009/0065368 A1 | | 3/2009 | Davis et al. |
| 2009/0317899 A1 * | | 12/2009 | Sarofim ............ B01L 3/502715 435/287.2 |
| 2013/0140177 A1 | | 6/2013 | Lin et al. |
| 2016/0245793 A1 * | | 8/2016 | Samsoondar ....... B01L 3/50273 |

FOREIGN PATENT DOCUMENTS

| | | |
|---|---|---|
| CN | 203772880 U | 8/2014 |
| CN | 106483180 A | 3/2017 |
| CN | 106483181 A | 3/2017 |
| CN | 106716137 A | 5/2017 |
| CN | 109590270 A | 4/2019 |
| CN | 209513801 U | 10/2019 |
| CN | 110632286 A | 12/2019 |
| CN | 111175529 A | 5/2020 |
| CN | 111257548 A | 6/2020 |
| CN | 211878005 U | 11/2020 |
| CN | 212060267 U | 12/2020 |

OTHER PUBLICATIONS

Chinese Office Action for Counterpart Chinese Application No. 202010128844.X, mailed Apr. 30, 2021, (9 pages).

* cited by examiner

IN-VITRO DIAGNOSTIC ANALYZER AND REAGENT CARD

CROSS-REFERENCE TO RELATED APPLICATIONS

This application is a national phase application based upon international patent application No. PCT/CN2020/115461, filed on Sep. 16, 2020, which claims priority to Chinese Patent Application No. 202010128844.X, filed on Feb. 28, 2020. The content of the above identified application is hereby incorporated herein in its entirety by reference.

TECHNICAL FIELD

The present application relates to the technical field of medical devices, and for example, to an in vitro diagnostic analyzer and a reagent card.

BACKGROUND

Reagent cards (also known as test cards, detection cards) are widely used in the medical industry. The reagent cards are integrated with biochemical detection electrodes, which are calibrated with a calibration solution for subsequent liquid sample (e.g., blood, tissue fluid, etc.) tests.

SUMMARY

The present application provides an in vitro diagnostic analyzer and a reagent card.

An embodiment of the present application provides a reagent card, including a reagent card body and a mounting body. The mounting body includes a mounting hole configured to receive a sample tube, a hollow needle disposed in the mounting hole, a sealing portion disposed in the mounting hole, and a gas inlet channel. An end of the hollow needle is capable of being inserted into the sample tube. The sealing portion is capable of being in sealing fit with an outer wall of the sample tube. The gas inlet channel includes a gas outlet hole, a gas inlet hole, and a first flow-stopping structure. The gas inlet hole is disposed in a surface of the reagent card body. The first flow-stopping structure is disposed between the gas outlet hole and the gas inlet hole. The gas outlet hole is configured to be in fluid communication with the sample tube mounted on the mounting hole. The reagent card body includes a sample feeding channel, a test chamber, and a venting end. The sample feeding channel is in fluid communication with a liquid outlet end of the hollow needle. The sample feeding channel and the venting end are both in fluid communication with the test chamber.

When the above-described reagent card is in use, the sample tube can be inserted into the mounting hole of the reagent card body. During this process, the hollow needle can be inserted into the sample tube. After the sample tube is mounted, the sealing portion is in sealing fit with the sample tube. When the gas inlet hole is opened, gas (e.g., air) is capable of entering the sample tube through the gas inlet channel. Thus, at this time, as the venting end is connected to the negative pressure generator to generate a suction force, the liquid in the sample tube can be sucked into the sample feeding channel through the hollow needle and can flow into the test chamber for detection and analysis by the detection device. When the gas inlet hole is closed, gas (e.g., air) is not capable of entering the sample tube through the gas inlet channel. In addition, the sample tube is sealed by the sealing portion. Thus, the sample tube is not capable of being communicated with the outside gas, so that the liquid in the sample tube is difficult to be sucked out through the hollow needle. The gas inlet hole is opened during the detection of the reagent card or when the test in the reagent card is completed but the reagent card is not disconnected in time. At this time, even if the gas inlet channel produces a siphonic action such that the liquid sample in the sample tube enters the gas inlet channel through the gas outlet hole, the liquid sample can be blocked off by the first flow-stopping structure, so that the liquid sample cannot flow out of the reagent card from the gas inlet channel. In this way, the liquid sample can be prevented from contaminating the detection device. In the on-off control on the liquid sample in the reagent card, there is no need to compress and deform the sample feeding channel to close the sample feeding channel, and the opening of the sample feeding channel is not relied on the self-restoration of the sample feeding channel. The on-off control on the liquid sample is realized by simply open and close the gas inlet hole by the retractable device, which can reduce the risks of liquid sample leakage and failure of drawing the liquid sample during sample analysis, and can avoid leakage of waste liquid due to an improper operation.

In an embodiment, the first flow-stopping structure includes a flow-stopping chamber, and the flow-stopping chamber is in fluid communication with the gas outlet hole and the gas inlet hole, respectively.

In an embodiment, the gas inlet channel includes a first flow channel and a second flow channel, the first flow channel is in fluid communication with the gas outlet hole and the flow-stopping chamber, and the second flow channel is in fluid communication with the gas inlet hole and the flow-stopping chamber. A liquid outlet end of the first flow channel and a liquid inlet end of the second flow channel are disposed adjacent to a top of the flow-stopping chamber or disposed at the top of the flow-stopping chamber.

In an embodiment, the liquid outlet end of the first flow channel and the liquid inlet end of the second flow channel are staggered with respect to each other; and/or the first flow-stopping structure further includes a baffle disposed in the flow-stopping chamber, the liquid outlet end of the first flow channel is separated from the liquid inlet end of the second flow channel by the baffle.

In an embodiment, the first flow-stopping structure is a flow-stopping valve; or the first flow-stopping structure is a tortuous first flow-stopping pipe.

In an embodiment, the sealing portion is provided with a sealing hole configured to be in sealing fit with a sample outlet end of the sample tube, the end of the hollow needle is disposed in the sealing hole, and the gas outlet hole is in fluid communication with the sealing hole.

In an embodiment, the reagent card body further includes a calibration solution channel, the calibration solution channel and the sample feeding channel are both in fluid communication with the test chamber through a first channel, the calibration solution channel includes a second flow-stopping structure, and the second flow-stopping structure is disposed adjacent to the first channel.

In an embodiment, along a direction of gravity when the reagent card body is in use, liquid inlet ends of the first channel, the test chamber, and the calibration solution channel are all disposed below a liquid inlet end of the sample feeding channel. The calibration solution channel includes a third flow channel, a fourth flow channel, and a transitional flow channel which is in fluid communication with the third flow channel and the fourth flow channel. The third flow channel extends from a liquid inlet end of the calibration solution channel to a liquid inlet end of the transitional flow channel; the fourth flow channel extends from a liquid outlet end of the transitional flow channel to a liquid inlet end of the first channel; the transitional flow channel is disposed between the liquid inlet end of the sample feeding channel and the liquid inlet end of the first channel; the fourth flow channel is disposed below the transitional flow channel; and the fourth flow channel includes the second flow-stopping structure.

In an embodiment, the second flow-stopping structure is a tortuous second flow-stopping pipe, and the second flow-stopping pipe includes at least two curved portions.

In an embodiment, a depth of the curved portions gradually decreases along a feeding direction of the calibration solution.

In an embodiment, the reagent card body further includes a waste liquid storage chamber being in fluid communication with a liquid outlet end of the test chamber, a liquid outlet end of the waste liquid storage chamber is in fluid communication with the venting end through a second channel, and along the direction of gravity when the reagent card body is in use, the liquid outlet end of the waste liquid storage chamber is disposed below the transitional flow channel.

An embodiment of the present application further provides an in vitro diagnostic analyzer, including the reagent card according to any one of the above-described embodiments, and further including a negative pressure generator, a first telescopic device, a detection device, and a controller. The negative pressure generator is connected to the venting end. The first telescopic device includes a sealing end configured to seal the gas inlet hole. The controller is configured to be in signal communication with the negative pressure generator, the first telescopic device, and the detection device. A detection end of the detection device is disposed in the test chamber.

When the above-described in vitro diagnostic analyzer is in use, the sample tube can be inserted into the mounting hole of the reagent card body. During this process, the hollow needle can be inserted into the sample tube. After the sample tube is mounted, the sealing portion is in sealing fit with the sample tube. Then, the reagent card is mounted to a predetermined position of the in vitro diagnostic analyzer. Only when the controller controls the first telescopic device to operate such that the sealing end moves away from the gas inlet hole, and that is, only when the gas inlet hole is opened, gas (e.g., air) is capable of entering the sample tube through the gas inlet channel. Thus, at this time, if the venting end is connected to the negative pressure generator and generates a suction force, the liquid in the sample tube can be sucked into the sample feeding channel through the hollow needle and can flow into the test chamber for detection and analysis by the detection device. When the controller controls the first telescopic device to operate such that the sealing end is in sealing fit with the gas inlet hole, and that is, when the gas inlet hole is closed, gas (e.g., air) is not capable of entering the sample tube through the gas inlet channel. In addition, the sample tube is sealed by the sealing portion. Thus, the sample tube is not capable of being communicated with the outside gas, so that the liquid in the sample tube is difficult to be sucked out through the hollow needle. The gas inlet hole is opened when the test in the reagent card is completed and the first telescopic device restores its position. When the gas inlet hole is not closed during the detection of the reagent card or when the test in the reagent card is completed but the reagent card is not disconnected in time, even if the gas inlet channel produces a siphonic action such that the liquid sample in the sample tube enters the gas inlet channel through the gas outlet hole, the liquid sample can be blocked off by the first flow-stopping structure, so that the liquid sample cannot flow out of the reagent card from the gas inlet channel. In this way, the liquid sample can be prevented from contaminating the detection device. The in vitro diagnostic analyzer has reliable on-off control on the liquid sample, which is beneficial to improving the reliability of test.

ILLUSTRATION FOR REFERENCE SIGNS 10, reagent card; 100, reagent card body; 110, sample feeding channel; 112, first channel; 120, test chamber; 130, venting end; 140, calibration solution channel; 142, second flow-stopping structure; 144, third flow channel; 146, fourth flow channel; 148, transitional flow channel; 150, first calibration solution container; 160, mating part; 170, valve core; 172, piercing part; 180, waste liquid storage chamber; 182, support rib; 190, second channel; 200, mounting body; 210, mounting hole; 220, hollow needle; 230, gas inlet channel; 231, gas inlet hole; 232, gas outlet hole; 233, first flow-stopping structure; 202, flow-stopping chamber; 204, baffle; 234, first flow channel; 235, second flow channel; 240, sealing portion; 242, sealing hole; 250, sealing layer; 252, elastic layer; 254, adhesive layer; 20, negative pressure generator; 40, first telescopic device; 42, sealing end; 44, sealing ring; 50, second telescopic device; 60, controller; 70, sample tube; 80, second calibration solution container.

DETAILED DESCRIPTION

It should be noted that when an element is referred to as being "fixed to", "disposed on", "fastened to" or "mounted to" another element, it can be directly located on the other element or an intermediate element may be present. When an element is referred to as being "connected to" another element, it can be directly connected to the other element or an intermediate element may be present. Further, when an element is considered to be "connected to" another element, the two can be fixed by detachable connection, or can be fixed by non-detachable connection, such as sleeve connection, snap connection, being integrated, welding, etc., which can be implemented in the related art, and are not repeated herein. An element being perpendicular to or substantially perpendicular to another element means that an ideal state is that the two elements are perpendicular to each other, but due to the influence of manufacturing and assembling, there may be some errors in perpendicularity. The terms "vertical", "horizontal", "left", "right" and similar expressions used herein are for the purpose of illustration only and do not means that they are the only implementations.

Unless otherwise defined, all technical and scientific terms used herein have the same meaning as commonly understood by one of ordinary skill in the technical field to which this application belongs. The terms used herein in the specification of the present application are for the purpose of describing particular embodiments only, and are not intended to limit the present application. As used herein, the term "and/or" includes any and all combinations of one or more of the associated listed items.

The terms defined with "first" and "second" in this application do not imply a specific quantity or order, but are only used for distinguishing names.

Figure 1:
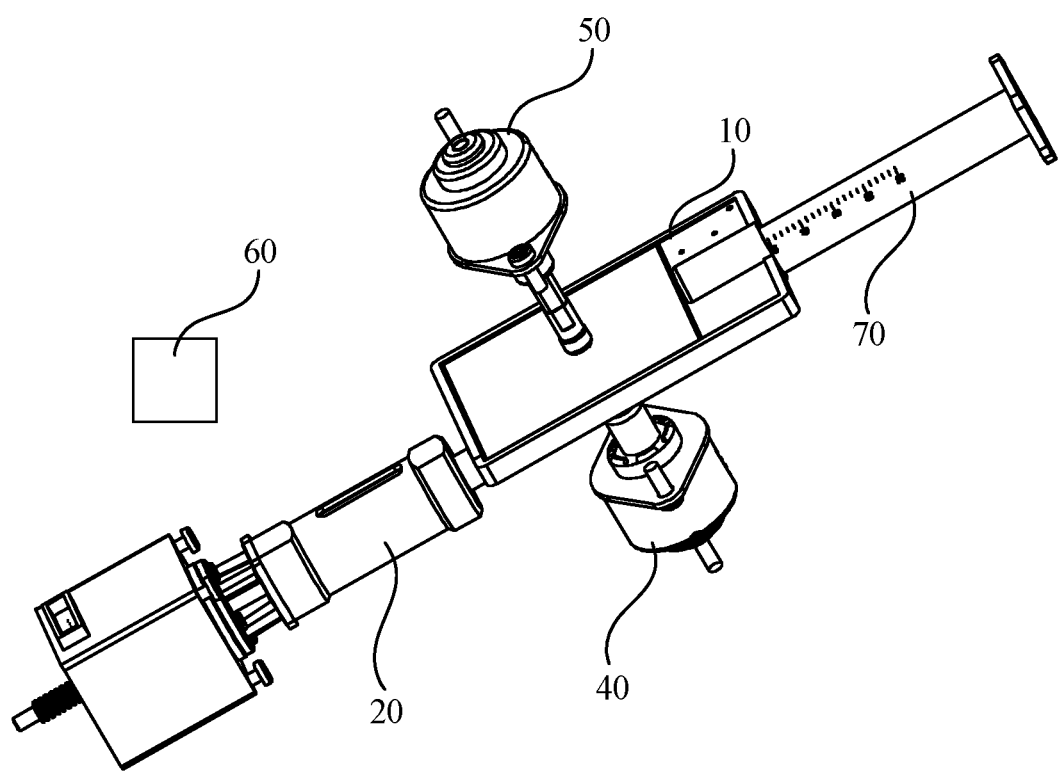
FIG. 1 is a schematic view of an embodiment of an in vitro diagnostic analyzer.
Figure 2:
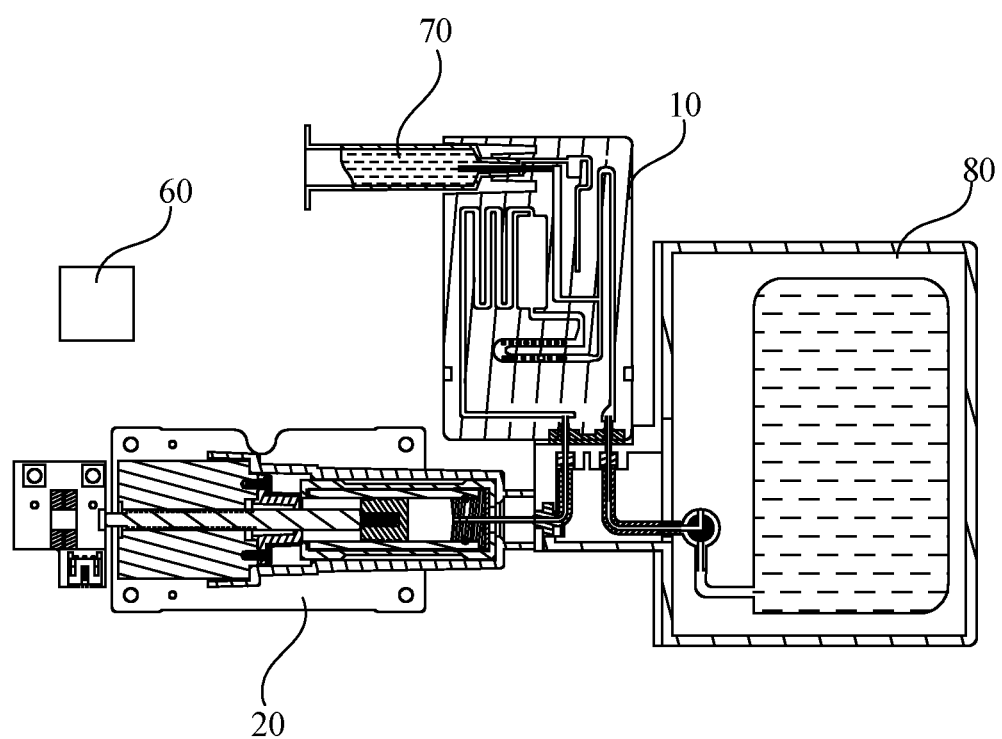
FIG. 2 is a schematic view of an embodiment of an in vitro diagnostic analyzer.
Figure 3:
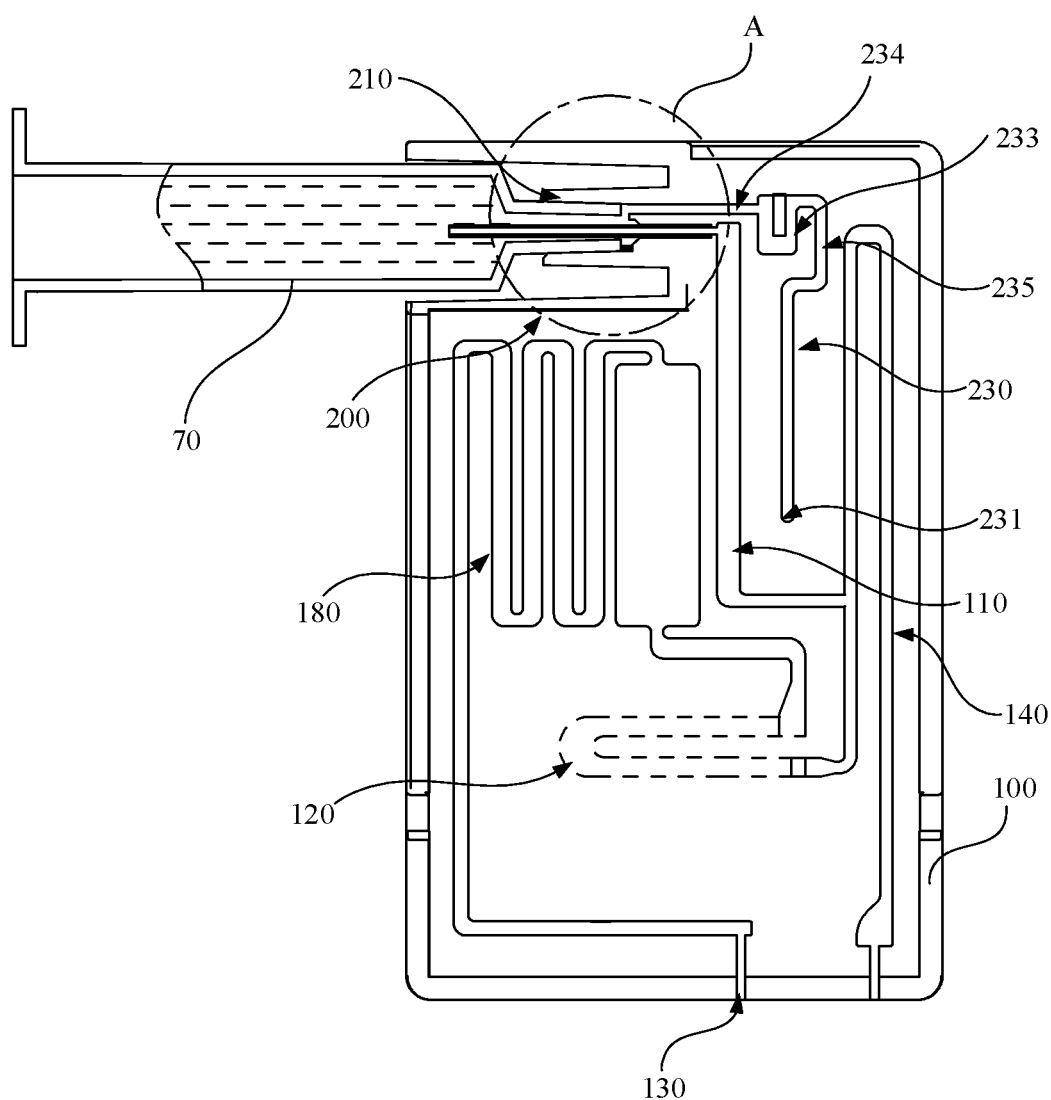
FIG. 3 is a schematic view of a reagent card shown in FIG. 2.

As shown in FIGS. 1 and 2, an in vitro diagnostic analyzer is provided, including a reagent card 10, a negative pressure generator 20, a sample tube 70, a first telescopic device 40, a detection device, and a controller 60.

As shown in FIGS. 3, 4, 7, and 9, the reagent card 10 includes a reagent card body 100 and a mounting body 200 fixed to the reagent card body. The mounting body 200 includes a mounting hole 210 configured to receive the sample tube 70, a hollow needle 220 disposed in the mounting hole 210, a sealing portion 240 disposed in the mounting hole 210, and a gas inlet channel 230. An end of the hollow needle 220 is capable of being inserted into the sample tube 70. The sealing portion 240 is capable of being in sealing fit with an outer wall of the sample tube 70. The gas inlet channel 230 includes a gas outlet hole 232, a gas inlet hole 231, and a first flow-stopping structure 233. The gas inlet hole 231 is disposed in a surface of the reagent card body 100. The first flow-stopping structure 233 is disposed between the gas outlet hole 232 and the gas inlet hole 231. The gas outlet hole 232 is configured to be in fluid communication with the sample tube 70 mounted on the mounting hole 210. The first flow-stopping structure 233 does not prevent gas from flowing into the sample tube from the gas inlet hole 231 via the gas inlet channel and the gas outlet hole 232, but is configured to prevent the liquid sample in the sample tube from flowing out of the test reagent card from the gas inlet hole 231. The reagent card body 100 includes a sample feeding channel 110, a test chamber 120, and a venting end 130. The sample feeding channel 110 is in fluid communication with a liquid outlet end of the hollow needle 220. The sample feeding channel 110 and the venting end 130 are both in fluid communication with the test chamber 120.

The negative pressure generator 20 is connected to the venting end 130. The sample tube 70 includes a sample outlet end. The sample outlet end is in clearance fit with the hollow needle 220. The first telescopic device 40 includes a sealing end 42. The sealing end 42 is configured to seal the gas inlet hole 231. The controller 60 is in signal communication with the negative pressure generator 20, the first telescopic device 40, and the detection device. A detection end of the detection device is disposed in the test chamber 120.

When the above in vitro diagnostic analyzer is in use, the sample tube 70 can be inserted into the mounting hole 210 of the reagent card body 100. During this process, the hollow needle 220 can be inserted into the sample tube 70. After the sample tube 70 is mounted, the sealing portion 240 is in sealing fit with the sample tube 70. Then, the reagent card 10 is mounted to a predetermined position of the in vitro diagnostic analyzer. Only when the controller 60 controls the first telescopic device 40 to operate such that the sealing end 42 moves away from the gas inlet hole 231, and that is, only when the gas inlet hole 231 is opened, gas (e.g., air) is capable of entering the sample tube 70 through the gas inlet channel 230. Thus, at this time, if the venting end 130 is connected to the negative pressure generator 20 and generates a suction force, the liquid in the sample tube 70 can be sucked into the sample feeding channel 110 through the hollow needle 220 and can flow into the test chamber 120 for detection and analysis by the detection device. When the controller 60 controls the first telescopic device 40 to operate such that the sealing end 42 is in sealing fit with the gas inlet hole 231, and that is, when the gas inlet hole 231 is closed, gas (e.g., air) is not capable of entering the sample tube 70 through the gas inlet channel 230. In addition, the sample tube 70 is sealed by the sealing portion 240. Thus, the sample tube 70 is not capable of being communicated with the outside gas, so that the liquid in the sample tube 70 is difficult to be sucked out through the hollow needle 220. The gas inlet hole 231 is opened during the detection of the reagent card 10 or when the test in the reagent card 10 is completed and the first telescopic device 40 restores its position. At this time, even if the gas inlet channel 230 produces a siphonic action such that the liquid sample in the sample tube 70 enters the gas inlet channel 230 through the gas outlet hole 232, the liquid sample can be blocked off by the first flow-stopping structure 233, so that the liquid sample cannot flow out of the reagent card 10 from the gas inlet channel 230. In this way, the liquid sample can be prevented from contaminating the detection device. The in vitro diagnostic analyzer has reliable on-off control on the liquid sample, which is beneficial to improving the reliability of test.

Optionally, the "negative pressure generator 20" can be any related liquid suction device that meets the requirements of the present application, such as a suction pump or a vacuum pump.

Optionally, the "controller 60" includes, but is not limited to, a programmable controller 60, a motion control card, a computer, or the like.

Optionally, the "sealing portion 240" includes, but is not limited to, a sealing ring 44, a sealing sleeve, a sealing layer 250, or other structures, as long as the sample tube 70 can be sealed and fixed in the mounting hole 210.

Optionally, the "sample tube 70" includes a syringe, a test tube, or other structures.

Optionally, the description that "an end of the hollow needle 220 can be inserted into the sample tube 70" can be understood as that an end of the hollow needle 220 protrudes from the bottom of the mounting hole 210 to form a connecting port.

"The bottom of the mounting hole 210" can be understood as a bottom wall corresponding to the sample outlet end of the sample tube 70 after the sample tube 70 is inserted. The bottom wall includes but not limited to that shown in FIG. 3, or can include other modified but equivalent solutions.

Figure 9:
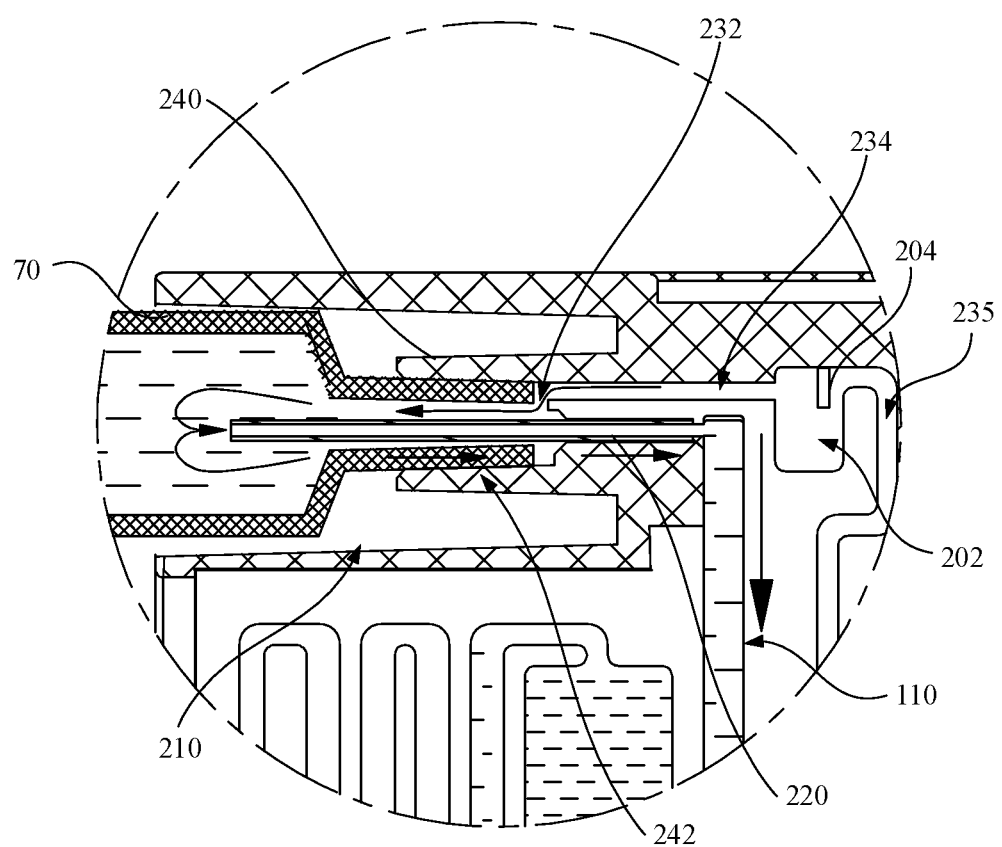
FIG. 9 is a partial enlarged schematic view of a portion B shown in FIG. 8.

On the basis of the above embodiments, as shown in FIG. 9, in an embodiment, the first flow-stopping structure 233 includes a flow-stopping chamber 202. The flow-stopping chamber 202 is in fluid communication with the gas outlet hole 232 and the gas inlet hole 231, respectively. In this way, the flow-stopping chamber 202 is used as a storage chamber, so that even if the gas inlet channel 230 produces the siphonic action, the storage chamber can be used for storing the residual liquid sample when the residual liquid sample in the sample tube 70 enters the gas inlet channel 230 through the gas outlet hole 232.

Exemplarily, as shown in FIG. 9, in an embodiment, the gas inlet channel 230 includes a first flow channel 234 and a second flow channel 235. The first flow channel 234 is in fluid communication with the gas outlet hole 232 and the flow-stopping chamber 202. The second flow channel 235 is in fluid communication with the gas inlet hole 231 and the flow-stopping chamber 202. A liquid outlet end of the first flow channel 234 and a liquid inlet end of the second flow channel 235 are disposed adjacent to the top of the flow-stopping chamber 202 or disposed at the top of the flow-stopping chamber 202. In this way, the volume of the flow-stopping chamber 202 can be fully utilized to store the liquid, so that overflow will occur only when the flow-stopping chamber 202 is full or nearly full and that the flow-stopping chamber 202 can be relatively small in size, which is beneficial to the development of the miniaturization of the reagent card 10.

Exemplarily, "the top of the flow-stopping chamber 202" can be understood as an end opposite to the bottom of the flow-stopping chamber 202 when the reagent card is in use, or can be understood as the top opposite to a liquid surface when the flow-stopping chamber 202 stores the liquid.

In an embodiment, the liquid outlet end of the first flow channel 234 and the liquid inlet end of the second flow channel 235 are staggered with respect to each other. In this way, the liquid from the liquid outlet end of the first flow channel 234 can be prevented from being directly injected into the liquid inlet end of the second flow channel 235 and flown out from the reagent card 10. In addition, the liquid outlet end of the first flow channel 234 and the liquid inlet end of the second flow channel 235 are staggered with respect to each other, so that even if a distance between the liquid outlet end of the first flow channel 234 and the liquid inlet end of the second flow channel 235 is relatively small, the flow-stopping chamber 202 can be fully utilized for liquid storage, which is beneficial to flexibly setting the shape of the flow-stopping chamber 202.

Or, in an embodiment, the first flow-stopping structure 233 further includes a baffle 204 disposed in the flow-stopping chamber 202. The liquid outlet end of the first flow channel 234 is separated from the liquid inlet end of the second flow channel 235 by the baffle 204. In this way, the baffle 204 can also be used to prevent the liquid from the liquid outlet end of the first flow channel 234 from being directly injected into the liquid inlet end of the second flow channel 235 to render overflow of the liquid from the reagent card 10. Even if a distance between the liquid outlet end of the first flow channel 234 and the liquid inlet end of the second flow channel 235 is relatively small, the flow-stopping chamber 202 can be fully utilized for liquid storage, which is beneficial to flexibly setting the shape of the flow-stopping chamber 202.

Or, as shown in FIG. 9, in an embodiment, the liquid outlet end of the first flow channel 234 and the liquid inlet end of the second flow channel 235 are staggered with respect to each other; and the first flow-stopping structure 233 further includes a baffle 204 disposed in the flow-stopping chamber 202. The liquid outlet end of the first flow channel 234 is separated from the liquid inlet end of the second flow channel 235 by the baffle 204. It can be seen from the foregoing analysis that the liquid from the liquid outlet end of the first flow channel 234 can be effectively prevented from being directly injected into the liquid inlet end of the second flow channel 235, so that the flow-stopping chamber 202 can be fully utilized for liquid storage, which is beneficial to flexibly setting the shape of the flow-stopping chamber 202.

In other embodiments of the first flow-stopping structure 233, the first flow-stopping structure 233 is a flow-stopping valve (not shown), or the first flow-stopping structure 233 is a tortuous first flow-stopping pipe. In this way, the flow-stopping valve or the tortuous flow-stopping pipe (refer to a second flow-stopping pipe shown in FIG. 11) can be used to stop the liquid flow.

Figure 11:
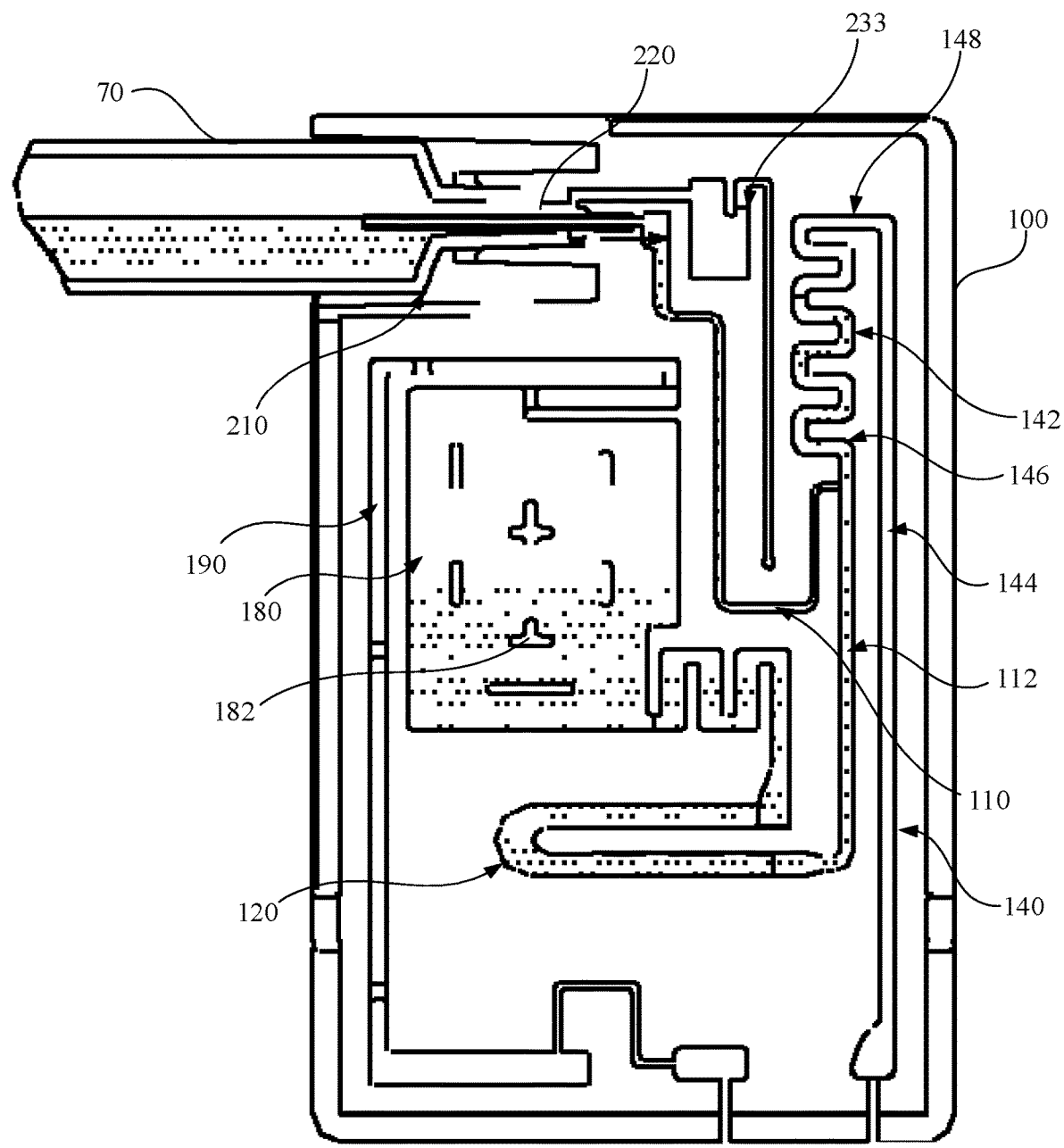
FIG. 11 is a schematic view of an embodiment of a reagent card in an anti-leakage state.

It is found in multiple tests that if a reagent card is not disconnected in time when the tests are completed, there is a risk that the liquid sample in the sample tube flows out from a liquid inlet end of a calibration solution channel. In order to solve this problem, on the basis of any of the above embodiments, as shown in FIG. 11, in an embodiment, the reagent card body 100 further includes a calibration solution channel 140. The calibration solution channel 140 and the sample feeding channel 110 are both in fluid communication with the test chamber 120 through a first channel 112. The calibration solution channel 140 includes a second flow-stopping structure 142. The second flow-stopping structure 142 is disposed adjacent to the first channel 112. In this way, when the test in the reagent card 10 is completed, if the reagent card 10 is not disconnected due to improper operation, even the residual liquid sample in the sample tube 70 and/or waste liquid enter the calibration solution channel 140 through the first channel 112 due to the siphonic action, the residual liquid sample and/or the waste liquid can be blocked off by the second flow-stopping structure 142, so that the liquid sample is not able to flow out of the reagent card 10 from the calibration solution channel 140, thereby preventing the liquid sample from contaminating the detection device.

On the basis of the above embodiments, as shown in FIG. 11, in an embodiment, along a direction of gravity when the reagent card body 100 is in use, the liquid inlet ends of the first channel 112, the test chamber 120, and the calibration solution channel 140 are all disposed below a liquid inlet end of the sample feeding channel 110. In this way, the calibration solution will not enter the sample feeding channel 110 when entering the test chamber 120. The test liquid is disposed at the highest location, which is beneficial to entering the test chamber 120.

Optionally, the calibration solution channel 140 includes a third flow channel 144, a fourth flow channel 146, and a transitional flow channel 148 in fluid communication with the third flow channel 144 and the fourth flow channel 146. The third flow channel 144 extends from the liquid inlet end of the calibration solution channel 140 to a liquid inlet end of the transitional flow channel 148. The fourth flow channel 146 extends from a liquid outlet end of the transitional flow channel 148 to a liquid inlet end of the first channel 112. The transitional flow channel 148 is disposed between the liquid inlet end of the sample feeding channel 110 and the liquid inlet end of the first channel 112. The fourth flow channel 146 is disposed below the transitional flow channel 148, and the fourth flow channel 146 includes the second flow-stopping structure 142. In this way, the calibration solution channel 140 including the third flow channel 144, the fourth flow channel 146 and the transitional flow channel 148 is tortuously arranged, which is also beneficial to forming a storage space and storing the waste liquid entering the calibration solution channel 140. Exemplarily, a siphonic height difference is formed between the transitional flow channel 148 and the sample tube 70. The second flow-stopping structure 142 disposed in the fourth flow channel 146 is beneficial to increasing the liquid flow resistance, thereby counteracting the siphonic force.

Optionally, "along the direction of gravity when the reagent card body 100 is in use" includes, but is not limited to, that shown in FIG. 11.

On the basis of any of the above-mentioned embodiments of the calibration solution channel 140, as shown in FIG. 11, in an embodiment, the second flow-stopping structure 142 is a tortuous second flow-stopping pipe, and the second flow-stopping pipe includes at least two curved portions. A depth of the curved portions gradually decreases along a feeding direction of the calibration solution. In this way, a length of the calibration solution channel 140 can be increased by including the tortuous second flow-stopping pipe in order to obtain larger resistance. By adopting the curved portions to increase the flow resistance and increase the storage capacity, the liquid sample or waste liquid is not capable of flowing to the transitional flow channel 148, thereby preventing the liquid from leaking from the liquid inlet end of the calibration solution channel 140.

In other embodiments, the second flow-stopping structure 142 includes, but is not limited to, a flow-stopping valve and a flow-stopping chamber 202.

In any of the above embodiments of the transitional flow channel 148, as shown in FIG. 11, in an embodiment, the reagent card body 100 further includes a waste liquid storage chamber 180 which is in fluid communication with a liquid outlet end of the test chamber 120. A liquid outlet end of the waste liquid storage chamber 180 is in fluid communication with the venting end 130 through a second channel 190. In addition, along the direction of gravity when the reagent card body 100 is in use, the liquid outlet end of the waste liquid storage chamber 180 is disposed below the transitional flow channel 148. In this way, the siphon phenomenon between the waste liquid storage chamber 180 and the transitional flow channel 148 can be reduced or avoided, which is beneficial to guiding the residual liquid sample into the waste liquid storage chamber 180 and making full use of the storage volume of the waste liquid storage chamber 180.

Exemplarily, as shown in FIG. 11, in an embodiment, the reagent card body 100 further includes a plurality of support ribs 182 disposed in the waste liquid storage chamber 180. In this way, the volume of the waste liquid storage chamber 180 can be fully supported by the support ribs 182 to avoid shrinkage of the waste liquid storage chamber 180 due to manufacturing or material problems, which is also beneficial to expanding the volume of the waste liquid storage chamber 180.

Figure 12:
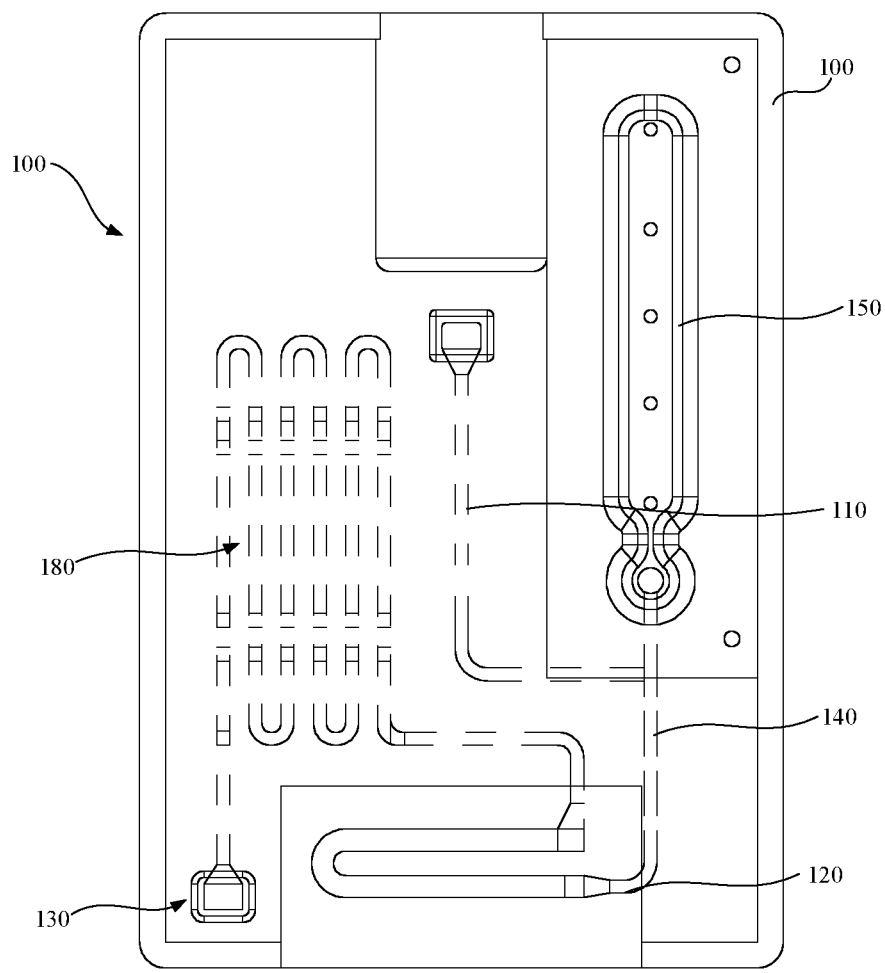
FIG. 12 is a schematic view of a reagent card shown in FIG. 1.
Figure 13:
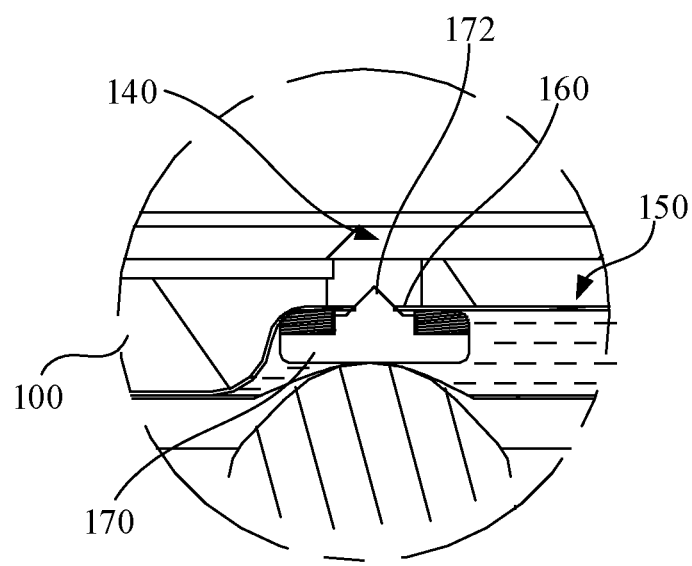
FIG. 13 is a schematic view of a second calibration solution and a valve core of the reagent card shown in FIG. 12.

On the basis of the above embodiments, as shown in FIGS. 12 to 13, in an embodiment, the reagent card body 100 further includes a first calibration solution container 150 and a valve core 170. The first calibration solution container 150 is fixed on the reagent card body 100. The first calibration solution container 150 includes a mating part 160 facing the calibration solution channel 140. The valve core 170 is disposed in the calibration solution channel 140 or in the first calibration solution container 150. The valve core 170 includes a piercing part 172 for piercing the mating part 160. The in vitro diagnostic analyzer further includes a second telescopic device 50, which is capable of being in signal communication with the controller 60. A telescopic end of the second telescopic device 50 can press against the calibration solution channel 140 or the first calibration solution container 150 in a predetermined direction, such that the piercing part 172 pierces through the mating part 160.

Figure 5:
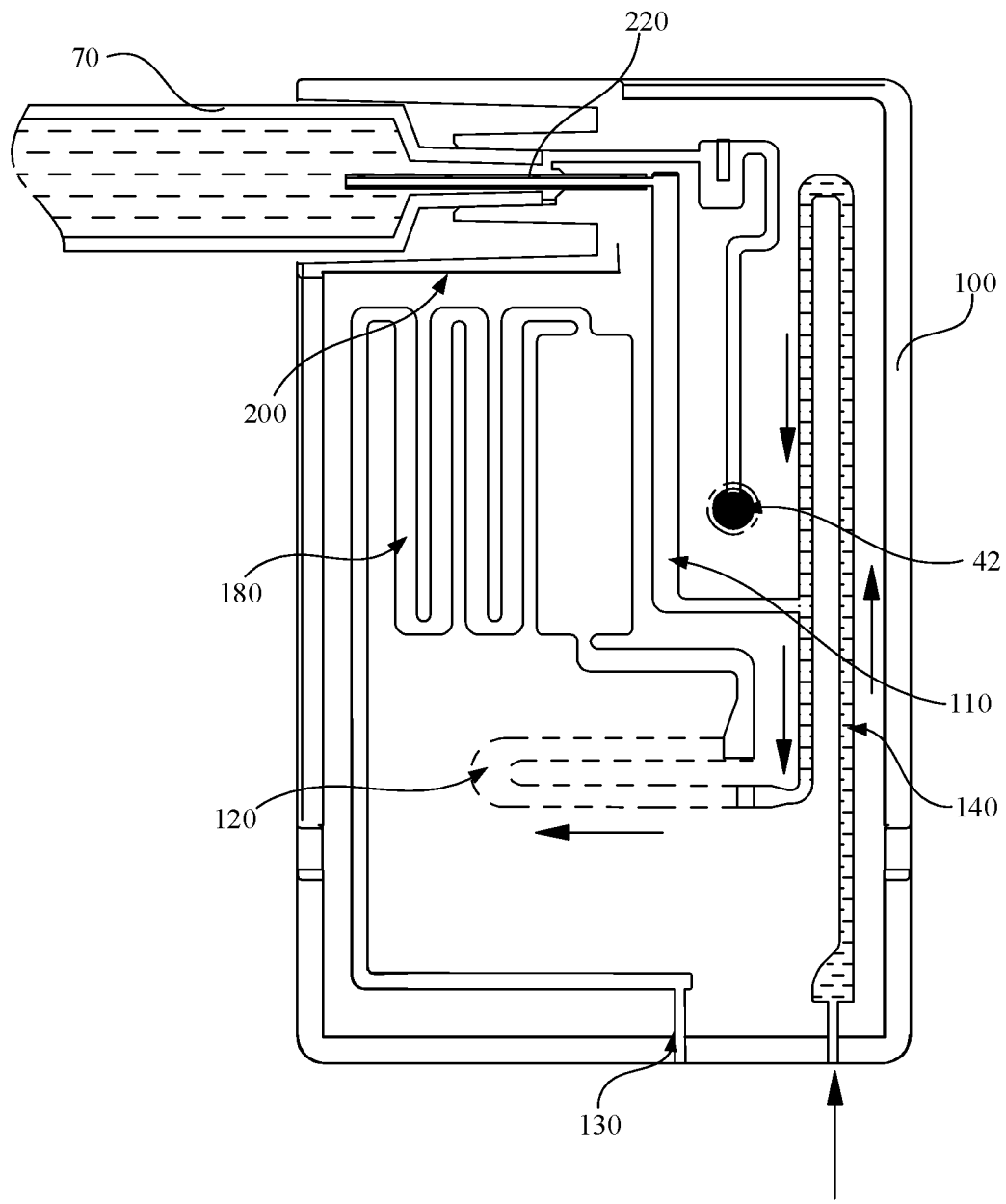
FIG. 5 is a schematic view of the reagent card shown in FIG. 3 when a calibration solution is sucked into the test card.
Figure 6:
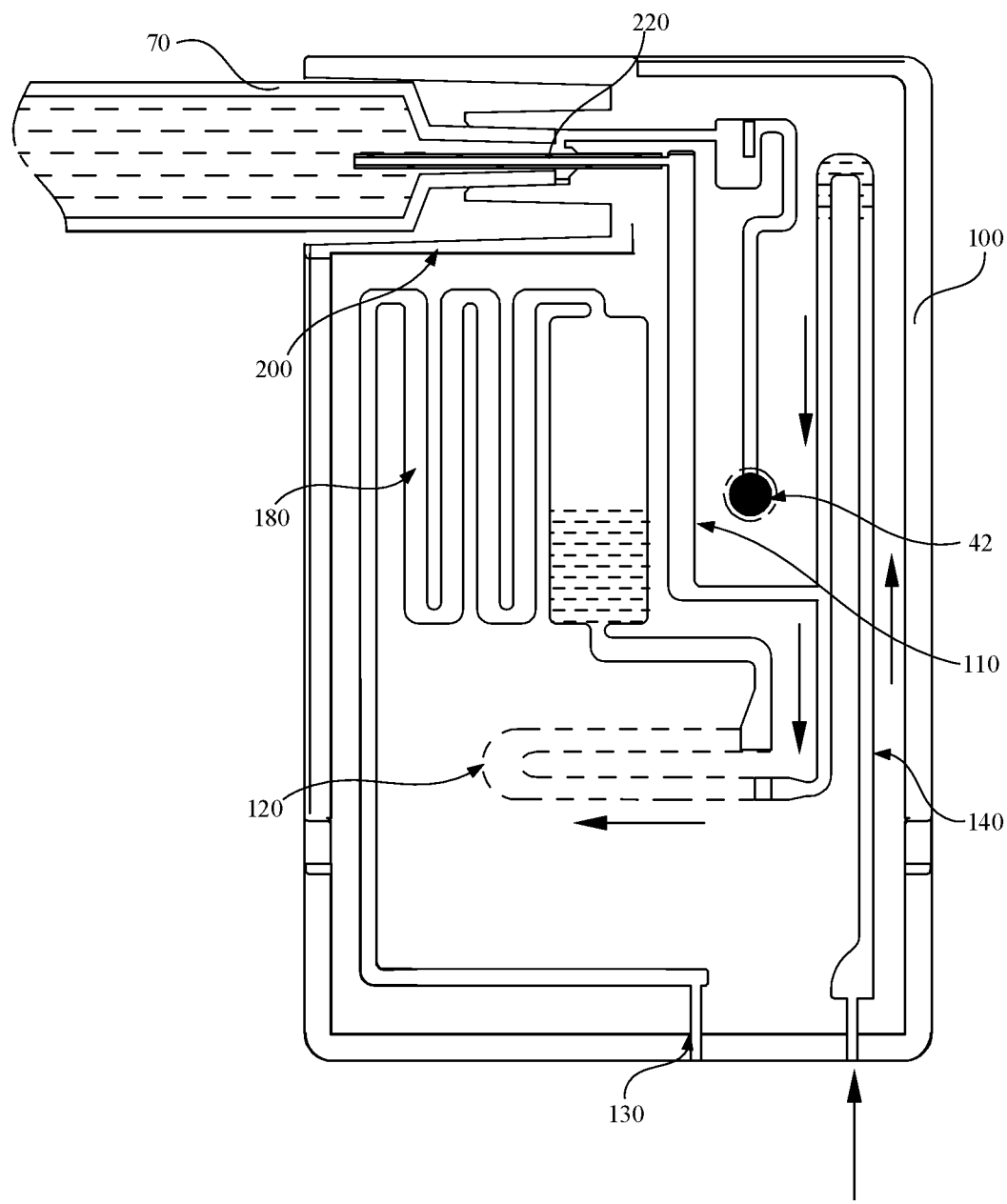
FIG. 6 is a schematic view of the reagent card shown in FIG. 3 after a calibration analysis.
Figure 7:
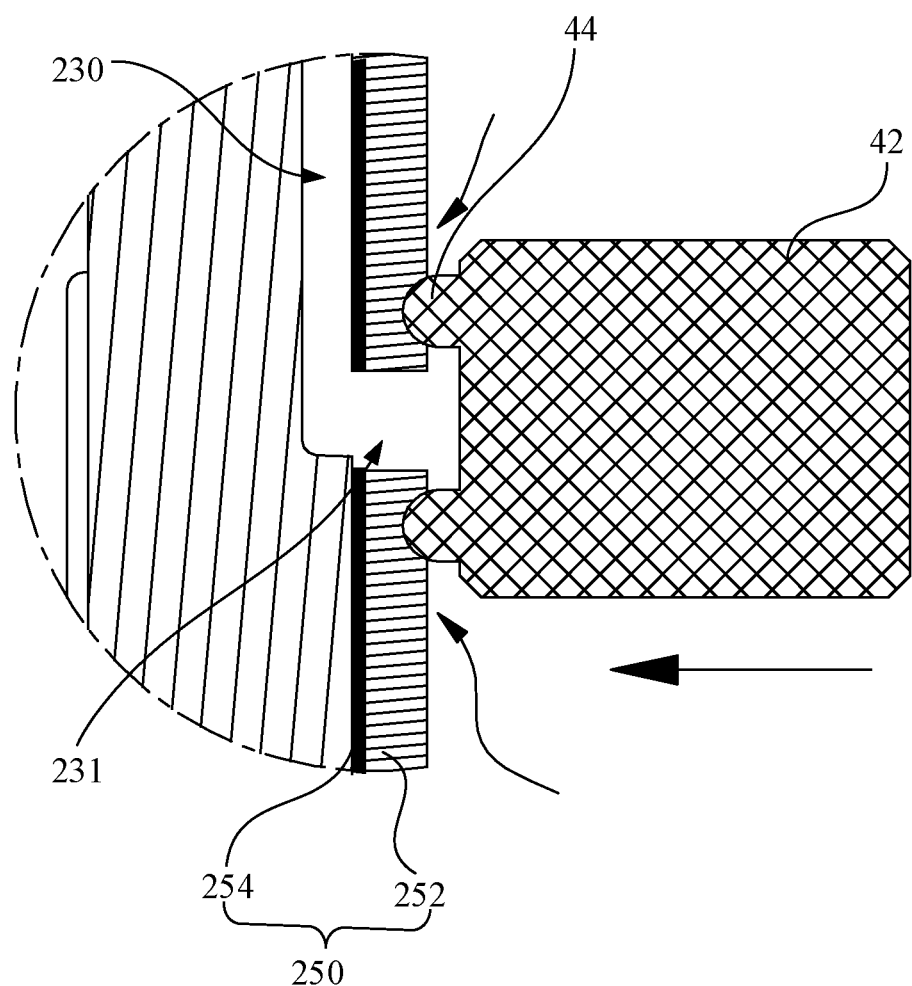
FIG. 7 is a schematic view of a state of a gas inlet hole when the reagent card is in the state shown in FIG. 5 or FIG. 6.
Figure 8:
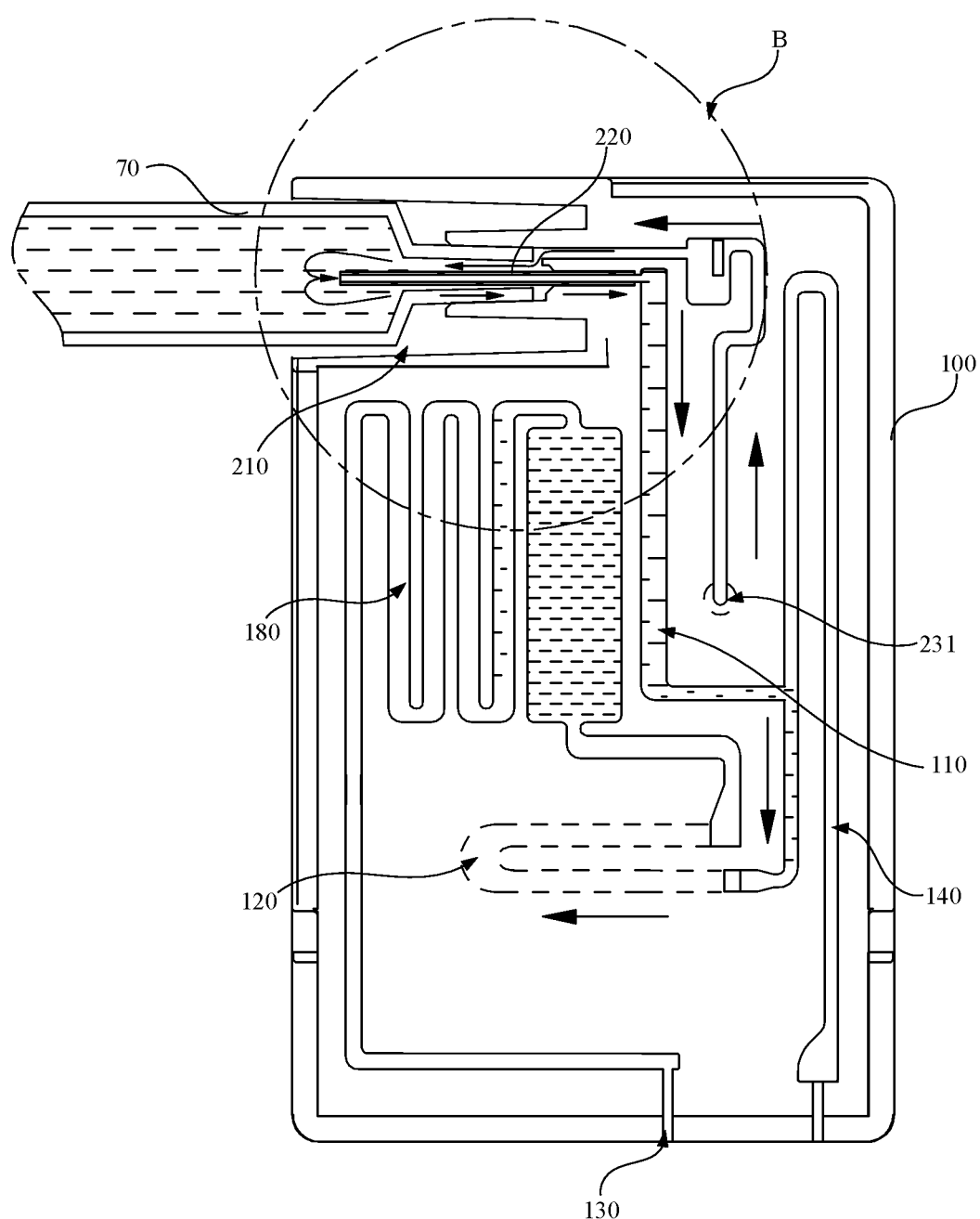
FIG. 8 is a schematic view of the reagent card shown in FIG. 3 when a liquid sample is sucked into the reagent card.

In this case, the calibration solution can be integrated into the reagent card body 100. Referring to FIGS. 1 and 3 to 10, during use, the sample tube 70 can be inserted into the mounting hole 210. During this process, the hollow needle 220 can be inserted into the sample tube 70. After the sample tube 70 is mounted, the sealing portion 240 is in sealing fit with the sample tube 70. Then, the reagent card 10 is mounted to a predetermined position of the in vitro diagnostic analyzer. The controller 60 controls the first telescopic device 40 to operate such that the sealing end 42 is in sealing fit with the gas inlet hole 231, and that is, the gas inlet hole 231 is closed (as shown in FIG. 7). Then, the calibration analysis is performed. The controller 60 controls the telescopic end of the second telescopic device 50 to press against the calibration solution channel 140 or the first calibration solution container 150 in the predetermined direction, and drives the piercing part 172 of the valve core 170 to pierce through the mating part 160, so that the calibration solution in the first calibration solution container 150 flows into the calibration solution channel 140 (as shown in FIG. 5). Then, the controller 60 controls the negative pressure generator 20 to operate, introducing the calibration solution into the test chamber 120 for calibration. After that, the detection device analyzes the calibration solution to complete the calibration analysis. After the calibration analysis, the negative pressure generator 20 continues to operate, drawing the calibration solution out from the test chamber 120 (as shown in FIG. 6). At this time, the first telescopic device 40 is controlled to operate such that the gas inlet hole 231 is opened. In this case, the negative pressure generator 20 continues to operate, and an appropriate amount of liquid sample (such as blood) can be sucked into the test chamber 120 (as shown in FIGS. 8 and 9). Then, the detection device again analyzes the liquid to be tested to obtain an analysis report of the liquid sample. During calibration, the in vitro diagnostic analyzer can precisely control the volume of the calibration solution that is drawn, ensure that the calibration solution completely covers the detection end of the detection device, accurately complete the calibration analysis, and obtain accurate calibration parameters. During this process, the open and close of the gas inlet hole 231 can be reliably controlled, and thus the liquid sample will not interfere with the calibration analysis. During the analyzing process of the liquid sample, the liquid sample is smoothly sucked, which is beneficial to a successful test of the liquid sample and improving the reliability.

In another embodiment, as shown in FIG. 2, the in vitro diagnostic analyzer further includes a second calibration solution container 80. The second calibration solution container 80 is in fluid communication with the calibration solution channel 140 through a valve (not labeled). Equivalently, in this case, the second calibration solution container 80 can be externally disposed outside the reagent card body 100, and can be connected to the reagent card body 100 through a pipe and a valve. The calibration solution can be stored in the in vitro diagnostic analyzer. The valve is configured to realize the fluid communication or insulation between the second calibration solution container 80 and the calibration solution channel 140.

Exemplarily, as shown in FIGS. 5 to 10, the controller 60 controls the first telescopic device 40 to operate such that the sealing end 42 is in sealing fit with the gas inlet hole 231, and that is, the gas inlet hole 231 is closed. Then, the calibration analysis is performed, and the valve is opened, so that the calibration solution in the second calibration solution container 80 flows into the calibration solution channel 140. Then, the controller 60 controls the negative pressure generator 20 to operate, introducing an appropriate amount of calibration solution into the test chamber 120 for calibration. After that, the detection device is analyzes the calibration solution. After the calibration analysis, the valve is closed, which can prevent the liquid in the second calibration solution container 80 from interfering with the subsequent test, and the second calibration solution container 80 can feed the next reagent card 10. When the calibration analysis is completed, the negative pressure generator 20 continues to operate, such that the calibration solution is drawn out from the test chamber 120. At this time, the first telescopic device 40 is controlled to operate such that the gas inlet hole 231 is opened. In this case, the negative pressure generator 20 continues to operate, and an appropriate amount of liquid sample (such as blood) can be sucked into the test chamber 120, and then the detection device is used to analyze the liquid to be tested, to obtain the test result of the liquid sample.

Optionally, the valve is an electromagnetic valve, which is in signal communication with the controller 60.

In addition, the valve includes, but is not limited to, a rotary valve or a linear slide valve.

Optionally, the "test chamber 120" includes, but is not limited to, a pipe or a cavity. Similarly, the "waste liquid storage chamber 180" includes, but is not limited to, a pipe or by a cavity.

Figure 4:
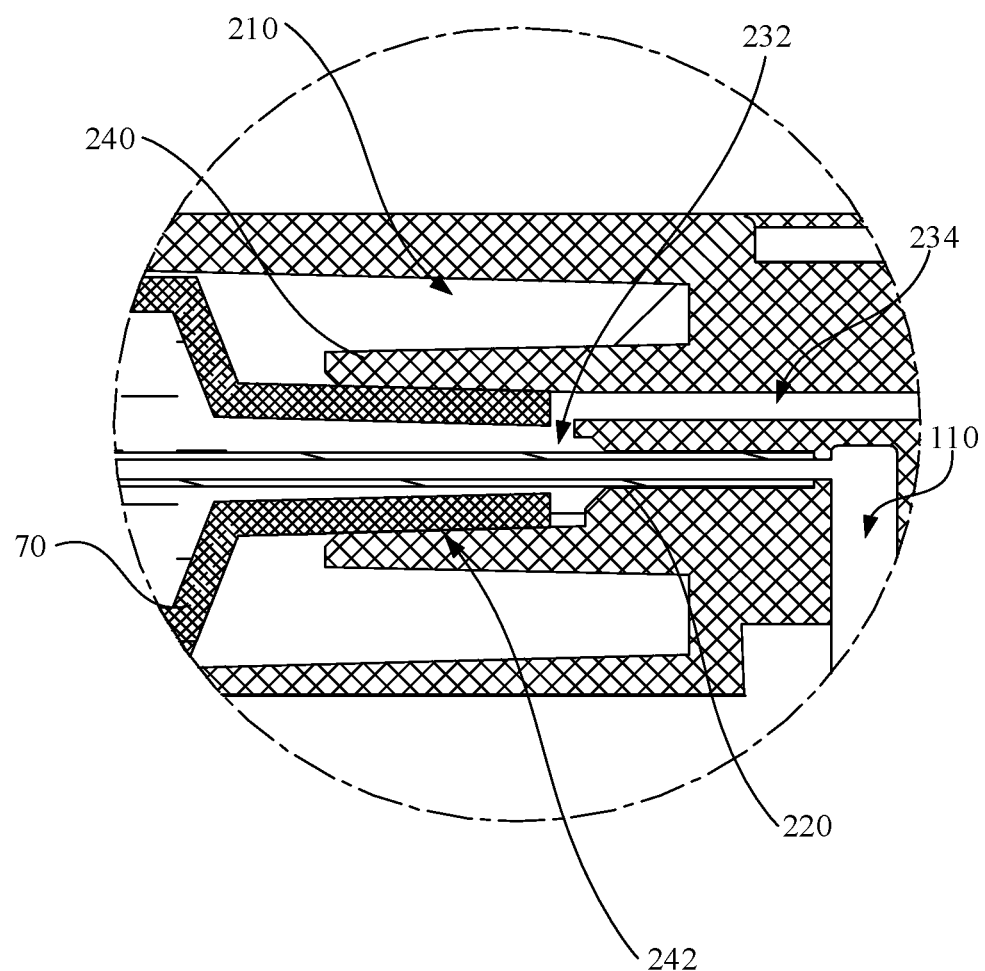
FIG. 4 is a partial enlarged schematic view of a portion A shown in FIG. 3.

On the basis of any of the above embodiments, as shown in FIGS. 4 and 9, in an embodiment, the sealing portion 240 is provided with a sealing hole 242. The sealing hole 242 is configured to be in sealing fit with the sample outlet end of the sample tube 70. The end of the hollow needle 220 is disposed in the sealing hole 242, and the gas outlet hole 232 is in fluid communication with the sealing hole 242. In this way, an inner sidewall of the sealing hole 242 is in tight contact with an outer sidewall of the sample outlet end of the sample tube 70, so that the sample tube 70 can be mounted in a sealed and reliable manner, so as to avoid gas leakage and avoid affecting the test result. In addition, the gas outlet hole 232 is disposed in the sealing hole 242, so that the gas inlet channel 230 can satisfactorily supply gas for the sample tube 70.

Figure 10:
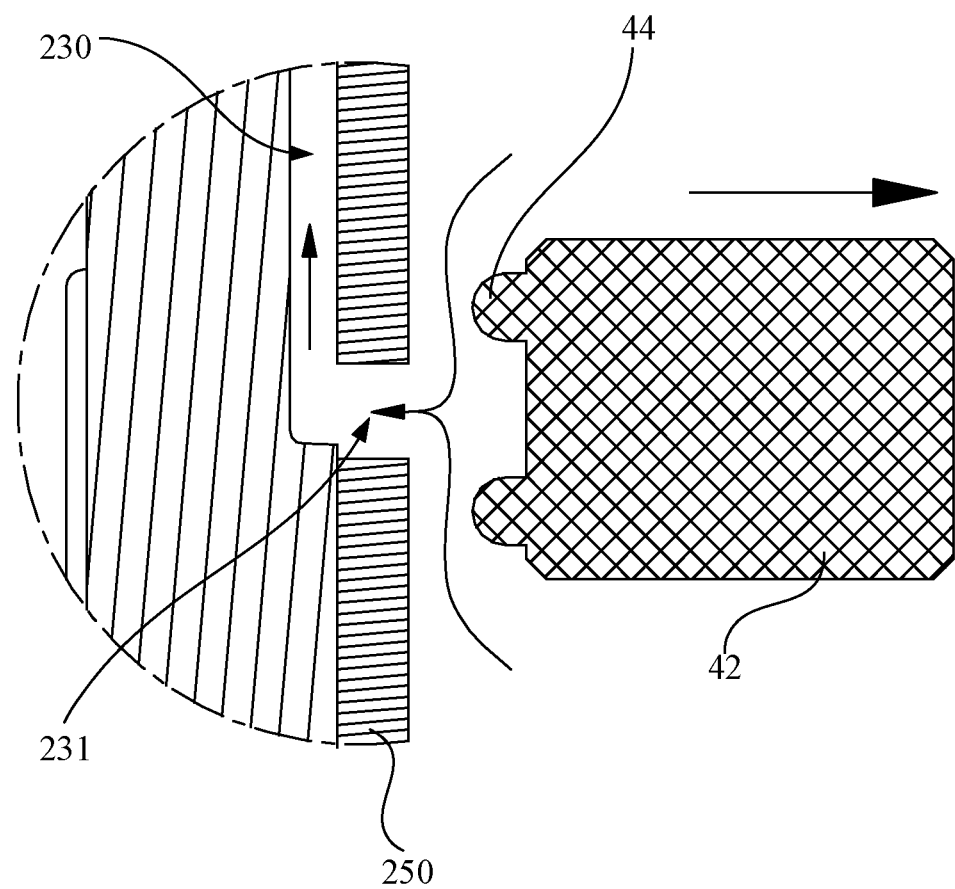
FIG. 10 is a schematic view of a state of the gas inlet hole when the reagent card is in the state shown in FIG. 8.

On the basis of any of the above embodiments, as shown in FIGS. 7 and 10, in an embodiment, a sealing layer 250 is disposed on an outer edge of the gas inlet hole 231. In this way, the sealing layer 250 can cooperate well with the sealing end 42 to provide a better sealing effect.

Exemplarily, as shown in FIG. 7, in an embodiment, the sealing layer 250 includes an elastic layer 252 and an adhesive layer 254 disposed on the elastic layer 252. The elastic layer 252 towards the outside. In this way, the elastic layer 252 can be adhered and fixed to an outer surface of the reagent card body by the adhesive layer 254, which is easy to be implemented.

On the basis of any of the above embodiments, as shown in FIG. 7 or 10, in an embodiment, the sealing end 42 includes a protruding sealing ring 44. The sealing ring 44 can be disposed around an outer edge of the gas inlet hole 231 in a sealing manner. In this way, the gas inlet hole 231 can be sealed well by the sealing ring 44, which in cooperation with the elastic layer 252 of the previous embodiments, is beneficial to the sealing effect.

Optionally, the sealing ring 44 is made of an elastic material.

Optionally, "the mounting body 200 and the reagent card body 100" can be, but is not limited to being, fixed through a detachable connection, such as sleeve connection or plug connection, or fixed through a non-detachable connection, such as heat welding or adhesive bonding.

In this embodiment, the mounting body 200 and the reagent card body 100 are integrally formed and manufactured.

The embodiments of reagent card adopt a new scheme for controlling supply and shutting off of a liquid sample, which can reduce the risks of liquid sample leakage and failure of drawing the liquid sample during sample analysis. The embodiments of the in vitro diagnostic analyzer in use have reliable on-off control on the liquid sample, which is beneficial to improving the reliability of test.

The technical features of the above embodiments can be combined arbitrarily. To simplify the description, not all possible combinations of the technical features in the above embodiments are described. However, all of the combinations of these technical features should be considered as being fallen within the scope of the present application, as long as such combinations do not contradict with each other.

What is claimed is:

1. A reagent card, comprising:
   a reagent card body, the reagent card body comprising:
      a sample feeding channel, a test chamber, and a venting end, the sample feeding channel and the venting end being both in fluid communication with the test chamber; and
   a mounting body, the mounting body comprising:
      a mounting hole configured to receive a sample tube;
      a hollow needle disposed in the mounting hole, an end of the hollow needle configured to be inserted into the sample tube, and the sample feeding channel being in fluid communication with a liquid outlet end of the hollow needle;
      a sealing portion disposed in the mounting hole, the sealing portion being capable of being in sealing fit with an outer wall of the sample tube; and
      a gas inlet channel comprising: a gas outlet hole configured to be in fluid communication with the sample tube mounted on the mounting hole;
      a gas inlet hole disposed in a surface of the reagent card body, and a first flow-stopping structure disposed between the gas outlet hole and the gas inlet hole.

2. The reagent card according to claim 1, wherein the first flow-stopping structure comprises a flow-stopping chamber, and the flow-stopping chamber is in fluid communication with the gas outlet hole and the gas inlet hole, respectively.

3. The reagent card according to claim 2, wherein the gas inlet channel comprises a first flow channel and a second flow channel, the first flow channel is in fluid communication with the gas outlet hole and the flow-stopping chamber, and the second flow channel is in fluid communication with the gas inlet hole and the flow-stopping chamber; a liquid outlet end of the first flow channel and a liquid inlet end of the second flow channel are disposed adjacent to a top of the flow-stopping chamber or disposed at the top of the flow-stopping chamber.

4. The reagent card according to claim 3, wherein the liquid outlet end of the first flow channel and the liquid inlet end of the second flow channel are staggered with respect to each other.

5. The reagent card according to claim 1, wherein the first flow-stopping structure is a flow-stopping valve; or the first flow-stopping structure is a tortuous first flow-stopping pipe.

6. The reagent card according to claim 1, wherein the sealing portion is provided with a sealing hole configured to be in sealing fit with a sample outlet end of the sample tube, the end of the hollow needle is disposed in the sealing hole, and the gas outlet hole is in fluid communication with the sealing hole.

7. The reagent card according to claim 1, wherein the reagent card body further comprises a calibration solution channel, the calibration solution channel and the sample feeding channel are both in fluid communication with the test chamber through a first channel, the calibration solution channel comprises a second flow-stopping structure, and the second flow-stopping structure is disposed adjacent to the first channel.

8. The reagent card according to claim 7, wherein along a direction of gravity when the reagent card body is in use, liquid inlet ends of the first channel, the test chamber, and the calibration solution channel are all disposed below a liquid inlet end of the sample feeding channel; the calibration solution channel comprises a third flow channel, a fourth flow channel, and a transitional flow channel in fluid communication with the third flow channel and the fourth flow channel; the third flow channel extends from a liquid inlet end of the calibration solution channel to a liquid inlet end of the transitional flow channel; the fourth flow channel extends from a liquid outlet end of the transitional flow channel to a liquid inlet end of the first channel; the transitional flow channel is disposed between the liquid inlet end of the sample feeding channel and the liquid inlet end of the first channel; the fourth flow channel is disposed below the transitional flow channel; and the fourth flow channel comprises the second flow-stopping structure.

9. The reagent card according to claim 8, wherein the reagent card body further comprises a waste liquid storage chamber being in fluid communication with a liquid outlet end of the test chamber, a liquid outlet end of the waste liquid storage chamber is in fluid communication with the venting end through a second channel, and along the direction of gravity when the reagent card body is in use, the liquid outlet end of the waste liquid storage chamber is disposed below the transitional flow channel.

10. The reagent card according to claim 7, wherein the second flow-stopping structure is a tortuous second flow-stopping pipe, and the second flow-stopping pipe comprises at least two curved portions.

11. An in vitro diagnostic analyzer, comprising the reagent card according to claim 1, and further comprising a negative pressure generator, a first telescopic device, a detection device, and a controller, wherein the negative pressure generator is connected to the venting end; the first telescopic device comprises a sealing end configured to seal the gas inlet hole; the controller is configured to be in signal communication with the negative pressure generator, the first telescopic device, and the detection device; a detection end of the detection device is disposed in the test chamber.

12. The reagent card according to claim 3, wherein the first flow-stopping structure further comprises a baffle disposed in the flow-stopping chamber, the liquid outlet end of the first flow channel is separated from the liquid inlet end of the second flow channel by the baffle.

13. The reagent card according to claim 3, wherein the liquid outlet end of the first flow channel and the liquid inlet end of the second flow channel are staggered with respect to each other; and the first flow-stopping structure further comprises a baffle disposed in the flow-stopping chamber, the liquid outlet end of the first flow channel is separated from the liquid inlet end of the second flow channel by the baffle.

14. The reagent card according to claim 9, wherein the reagent card body further comprises a plurality of support ribs disposed in the waste liquid storage chamber.

15. The reagent card according to claim 7, wherein the reagent card body further comprises a first calibration solution container and a valve core, the first calibration solution container comprises a mating part facing the calibration solution channel, the valve core is disposed in the calibration solution channel or in the first calibration solution container, the valve core comprises a piercing part configured to pierce the mating part.

16. The reagent card according to claim 1, further comprising a sealing layer disposed on an outer edge of the gas inlet hole, wherein the sealing layer comprises an elastic layer and an adhesive layer disposed on the elastic layer.

17. The in vitro diagnostic analyzer according to claim 14, further comprising a second telescopic device, wherein the second telescopic device is configured to be in signal communication with the controller, a telescopic end of the second telescopic device is configured to press against the calibration solution channel or the first calibration solution container in a predetermined direction.

* * * * *